June 12, 1956     V. T. WIGLESWORTH     2,749,621
CALIPERS
Filed Jan. 23, 1951
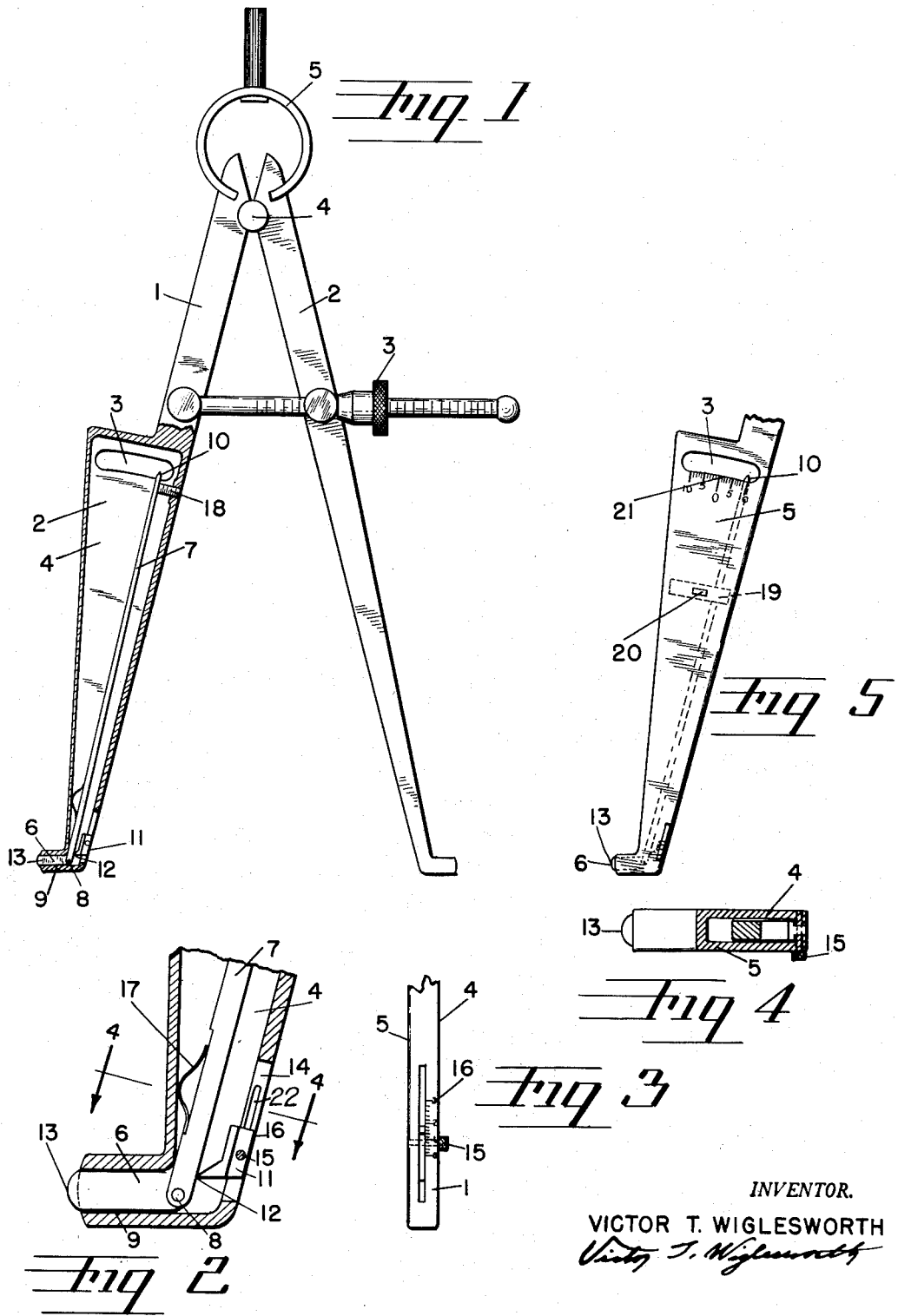
INVENTOR.
VICTOR T. WIGLESWORTH

United States Patent Office 2,749,621
Patented June 12, 1956

2,749,621

CALIPERS

Victor T. Wiglesworth, Portland, Oreg.

Application January 23, 1951, Serial No. 207,407

2 Claims. (Cl. 33—148)

This invention relates in general to calipers and like mensurating devices; in particular, to calipers having a visual amplifying scale, forming a part thereof.

I have as the objects of my invention the following:

(a) Improved calipers and like structures characterized as having indicating scales that are adjustable in scope;

(b) To provide the art with indicating calipers equipped with scale means for visually amplifying the feel of the operator to an exactly set dimension;

(c) To provide improved calipers and mensurating devices having adjustment means which enable changing the scale reading from one digit to another digit;

(d) To provide a holding mechanism associated with the indicator arm, hereinafter described, to hold the same in a set position until the caliper or like device is taken from the work for the reading;

Other objects of the present invention are described hereinafter.

In the accompanying drawings;

Fig. 1 is a sectional elevation of my calipers with the indicator and adjustable fulcrum;

Fig. 2 is a sectional elevation of the lower leg, showing the fulcrum adjustment;

Fig. 3 is a side view taken from Fig. 2, showing the fulcrum scale; and,

Fig. 4 is a section taken on lines 4—4 of Fig. 2;

Fig. 5 is a view, taken in elevation, of the indicating leg of the calipers, showing the indicator and scale.

The accompanying drawings are described in detail subsequently.

My improved calipers and mensurating devices, as shown in the drawings, are of the inside type familiar in the art, having a pair of legs 1 and 2, the usual adjustment means 3, a hinge point 4, and a spring tension clip 5.

It will be evident that this equipment and the elements thereof, being standard and common to either the inside type calipers (as shown) or the outside type calipers, shows that the present invention embraces either the inside or the outside type.

The leg 1 is provided with a hollow portion 2, having an opening 3 in the walls 4 and 5; an indicating arm 7 being fastened to a contact element 6 by bearing pin 8.

The contact member 6 having an indicator arm attached to its one end by the hinge pin 8, the contact member 6 is movable within the recess 9, forming the foot of the leg 1, with the indicator arm extending upwards in the hollow portion 2 of the leg 1, the tip 10 of the indicator being visible through opening 3.

A bar 11 is positioned within the hollow portion 2 and in the lower end of the leg 1, the bar 11 being the fulcrum point for the indicator arm 7 when pressure is applied to the contact member or element 6, as indicated at 12.

The position of the fulcrum point 12 relative to and away from the hinge point 8 governs the distance the tip 10 of the indicator arm 7 moves relative to the movement of the contact member 6 when pressure is applied to the same member at 13. The bar 11 being movable within the opening 14 and having a locking screw 15 to hold the bar in a set position on the scale 16 allows the operator to select the scale he desires to employ, e. g., $\frac{1}{10}$, $\frac{1}{100}$, $\frac{1}{1000}$, and so on.

A spring 17 mounted on the edge of the indicator arm is provided for returning said arm to a start position against a stop 18.

In Fig. 5 there is shown a holding mechanism for the indicator arm in cases where the operator desires to hold a reading after removing the instrument from the work, and comprising a plate 19 (shown in dotted position) having a push button 20 extending through the wall 5 of the leg 1, when pressure is applied to the said button the indicator arm will be held in position until read.

In using a pair of the calipers it is necessary for the operator to possess a feel or know-how of experience, as will be evident to those skilled in the art. In operating my improved calipers a reading should be made from a set scale until the indicator point 10 reads to the zero mark of the scale 21; then, when transferring to the work the operator reads the indicator to zero, and the fulcrum ratio adjustment allows the operator to select coarse, medium or fine readings.

As desired, a plastic or glass magnifying lens may be suitably positioned with respect to scale, especially for high precision measurements.

I claim:

1. An article of manufacture including indicating calipers, an indicating arm associated with one leg of said calipers and mounted within said leg member, said arm being hinged to a contact shaft, bearings within the lower end of said leg, a fulcrum pin adjustable in relation to the hinged connection of the indicating arm and the contact shaft, said fulcrum pin movable toward and away from said hinged point within slots formed within the caliper leg member, locking means forming part of the fulcrum pin to lock said fulcrum pin within the slotway, and a flat spring member urging the indicating arm against the fulcrum pin above the hinge point and positioning the contact shaft end outward from the lower end of the leg member.

2. An article of manufacture including indicating calipers, a hollow leg forming part of said calipers, a shaft bearing within the lower end of said leg member and extending outward therefrom and formed in a contact point on its outer end, an indicating arm positioned within the hollow leg and hinged to the inner end of the said shaft, a fulcrum member positioned within a slotway in the hollow leg member and movable parallel to the indicating arm toward or away from the hinged correction, a locking screw riding within the slot and forming part of the fulcrum member to maintain lever dimensions, spring means forming part of the arm urging contact of said arm with said fulcrum member, and an adjustment stop member associated with said hollow leg member abutting said arm and maintaining said arm end to scale adjustment.

References Cited in the file of this patent

UNITED STATES PATENTS

| | | |
|---|---|---|
| 569,500 | Juney | Oct. 13, 1896 |
| 1,129,289 | Grant | Feb. 23, 1915 |
| 1,198,702 | Cooper | Sept. 19, 1916 |
| 1,209,395 | Church | Dec. 19, 1916 |
| 1,390,432 | Douglass | Sept. 13, 1921 |
| 1,461,083 | Damerell | July 10, 1923 |
| 1,476,904 | Malmquist | Dec. 11, 1923 |
| 2,408,944 | Miller | Oct. 8, 1946 |